B. G. COOK.
TRAP.
APPLICATION FILED NOV. 26, 1912.
1,063,857. Patented June 3, 1913.
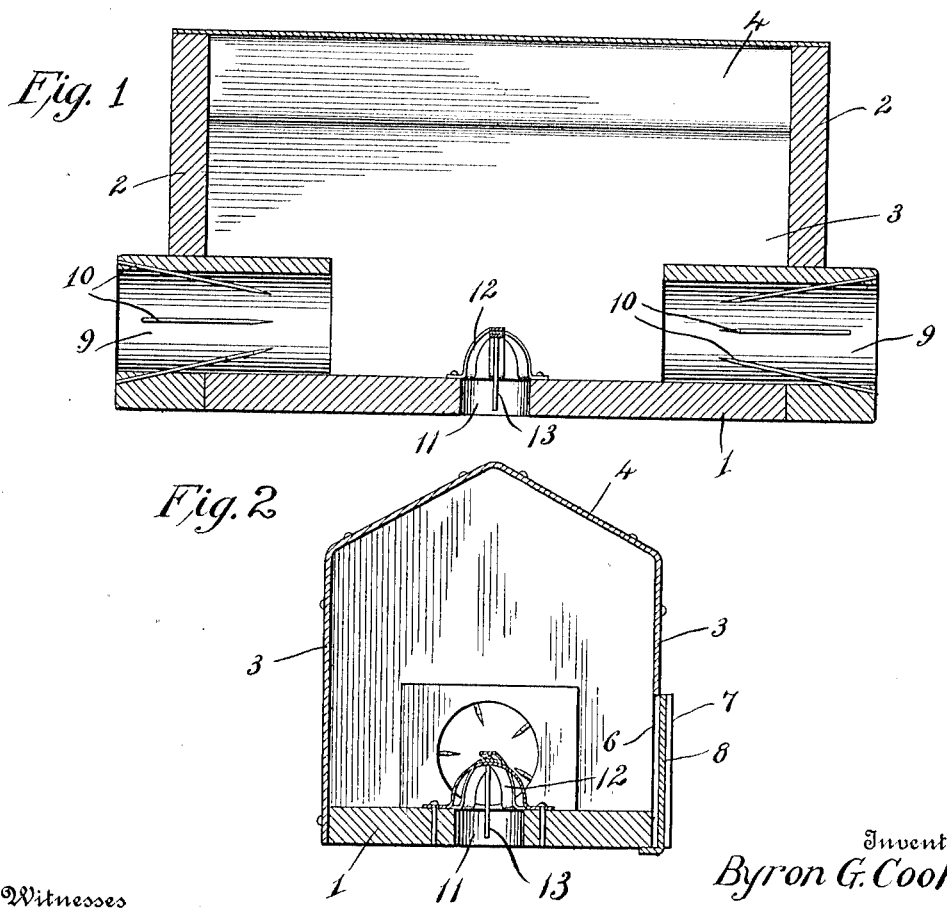

UNITED STATES PATENT OFFICE.

BYRON G. COOK, OF COVINGTON, TENNESSEE.

TRAP.

1,063,857.  Specification of Letters Patent.  Patented June 3, 1913.

Application filed November 26, 1912. Serial No. 733,661.

*To all whom it may concern:*

Be it known that I, BYRON G. COOK, a citizen of the United States, residing at Covington, in the county of Tipton and State of Tennessee, have invented new and useful Improvements in Traps, of which the following is a specification.

This invention is an improved trap for catching rats, mice and other animals and consists in the construction, combination and arrangement of devices hereinafter described and claimed, the object of the invention being to provide an improved trap which is extremely cheap and simple, which may be made of any suitable size and of any suitable material for catching rats and mice and other animals of various sizes, and in which there is an improved bait holder reached through an opening in the bottom of the trap to enable bait to be readily supplied to the trap through the said bottom opening and without the necessity of placing the bait within the trap.

In the accompanying drawing: Figure 1 is a vertical longitudinal central sectional view of a trap provided with an improved bait cage and bait holding pin in accordance with my invention. Fig. 2 is a vertical transverse sectional view of the same.

The body of the trap here shown comprises a bottom 1, vertical end walls 2, side walls 3 and a top 4 which is shaped like a gable roof. The side walls and top of the trap are formed from a single piece of suitable sheet metal and are secured to the side edges of the bottom and end walls. One side wall of the trap is provided with a door opening 6. At opposite sides of the door opening are guides 7 which are engaged by the side edges of a vertically movable door 8, the door being also preferably made of sheet metal.

The trap is provided in its ends with tubular entrances 9 the outer ends of which project outwardly therefrom and the inner ends of which extend inwardly a slight distance within the end wall and each tubular entrance is provided in its interior with a series of radially arranged inwardly converging spring bars 10, the inner ends of which are sharpened. These spring bars enable a rat, mouse or other animal to readily enter the trap through one of the tubular entrances but prevent him from leaving the trap.

In the bottom of the trap and preferably at a point midway between and opposite the inner ends of the tubular entrances is a bait-receiving opening 11. A bait cage 12 is arranged in the body of the trap and the lower ends of its crossed arms are secured on the bottom of the trap at points around the opening 11 so that the bait cage can be reached through the bottom of the trap. A bait receiving pin 13 depends from the top of the bait cage and enables bait to be placed thereon through the opening 11 and held in the cage.

When the trap is in use, the bait receiving opening is closed by the floor or other surface on which the trap bears. The bait cage not only serves to hold the bait but also serves to prevent the animals in the trap from escaping through the opening 11 when the trap is raised from the floor.

For the purposes of this specification, I have shown my improved trap provided with a tubular entrance, at each end, and with a single bait receiver. The trap may be made with any suitable number of tubular entrances, one or more, according to the size of the trap and the kind of animals it is designed to catch whether rats or mice, or the like, and may be also provided with one or more bait receivers, within the scope of my invention.

I claim:—

A trap of the class described having a bottom provided with a bait opening, a cage in the trap secured on and extending around and over the said opening, and a bait holding pin extending downwardly from the top of the bait cage and into the center of the opening.

In testimony whereof I affix my signature in presence of two witnesses.

BYRON G. COOK.

Witnesses:
JAS. R. FALLIN,
J. H. PITT.

Copies of this patent may be obtained for five cents each, by addressing the "Commissioner of Patents, Washington, D. C."